Patented Jan. 30, 1951

2,539,385

UNITED STATES PATENT OFFICE 2,539,385

SOUND RECORD FROM POLYVINYL HALIDE, BUTADIENE-ACRYLONITRILE RUBBER, AND VINSOL

Clinton L. Parker, Indianapolis, Ind., assignor to Radio Corporation of America, a corporation of Delaware No Drawing. Application May 28, 1948,
Serial No. 29,920

4 Claims. (Cl. 260—27)

This invention relates to thermoplastic molding compositions and to articles molded therefrom. More particularly, the invention relates to resinous compositions including vinyl resins and acrylonitrile-butadiene synthetic rubber.

It has been well known to make molded articles, such as phonograph records, out of molded compositions comprising vinyl polymers and copolymers, either with or without filler materials. Also, other resins have been mixed with the vinyl resin in order to decrease the cost of the product or for other reasons but, in general, when most other resins are mixed with vinyl polymers or copolymers, a degradation of the physical properties results. In the present invention, however, soft diluent resins may be added to the vinyl resins without any substantial decrease in wear resistance and cold flow properties, while flexibility and flexural strength of the product are improved.

One object of the present invention is to provide resinous compositions containing vinyl polymers or copolymers with certain other resinous materials in which the physical properties are improved.

Another object is to provide an improved molded article, such as a phonograph record, which has improved physical properties.

Another object is to provide an improved resinous composition containing certain vinyl resins and acrylonitrile-butadiene synthetic rubber.

Another object of the invention is to provide resinous compositions which include certain vinyl polymers or copolymers, soft diluent resins and acrylonitrile-butadiene synthetic rubber.

The vinyl resins which may be used in the present invention include polyvinyl chloride, vinyl chloride-vinyl acetate copolymers, in which the vinyl acetate may vary from 2.5% to 15%, and vinyl chloride-vinylidene chloride copolymers, in which the vinylidene chloride may vary from 5% to 10%.

The second essential ingredient of the compositions is acrylonitrile-butadiene synthetic rubber. It is well known that this material is a copolymer of the two constituents, acrylonitrile and butadiene.

To the above two resinous materials, there may be added an extender resin, preferably having a softening point between 100° and 120° C. Examples of these are the gasoline insoluble aromatic hydrocarbon soluble resinous extract of pinewood, and resins made by the polymerization of liquid hydrocarbons formed in the vapor phase pyrolysis of petroleum above 1300° F. These resins are particularly suitable because they have a relatively sharp softening point and, therefore, a high resistance to cold flow. Their relatively low softening points also increase the ease of molding of the resinous composition. The former of the two preferred resins referred to may have a softening point of 110° to 120° C. while the latter may have a softening point of 100° to 115° C.

The above are the essential resinous ingredients but in the making of molded objects, such as phonograph records, it is desirable to add certain other materials to the compositions. A metallic stearate may be incorporated for the dual purpose of lubrication of the compound to facilitate press handling and of stabilization of the compound, itself. This is commonly called a mold lubricant. In order to impart increased wear resistance to articles made of the compositions, either natural or synthetic waxes may also be included in the formulation. Suitable natural waxes include carnauba, ceranova, montan and others, while the synthetic waxes may include those such as microcrystalline hydrocarbon waxes having a melting point of 83° to 85° C., straight chain hydrocarbon waxes such as those with a molecular weight of 20,000 and a melting point of 102° C. and cetyl acetamide, having a melting point of 95° to 97° C. Generally speaking, any natural or synthetic wax may be used.

Coloring agents, such as carbon black or compatible dyes, may be included in the compositions without any appreciable change in the compound properties.

Also, various fillers may be used. These may be mineral fillers, such as finely divided limestone, slate, diatomaceous earth and finely ground clays. Cellulosic fibers or wood flour may also be employed, in whole or in part, as the filler material.

Examples of typical compositions suitable for making phonograph records follow:

*Example I*

| | Per cent |
|---|---|
| Vinyl chloride-vinyl acetate copolymer (VYHH) | 40 |
| Soft diluent resins having a softening point between 100° to 120° C., such as a resin made by the polymerization of liquid hydrocarbons formed in the vapor phase pyrolysis of petroleum above 1300° F. | 28 |
| Acrylonitrile-butadiene synthetic rubber | 6 |
| Zinc stearate | 2 |
| Carnauba wax | 1 |
| Carbon black | 3 |
| Mineral filler | 20 |
| | 100 |

Example II

| | Per cent |
|---|---|
| Vinyl chloride-vinylidene chloride copolymer (95% vinyl chloride) | 20 |
| Acrylonitrile-butadiene synthetic rubber | 8 |
| Gasoline-insoluble, aromatic hydrocarbon soluble resinous extract of pinewood | 15 |
| Carbon black | 2 |
| Carnauba wax | 1 |
| Zinc steareate | 2 |
| Mineral filler | 52 |
| | 100 |

Although specific examples of compositions suitable for making phonograph records have been indicated, the ranges of the various materials in the composition may be varied within rather wide limits, with satisfactory results. For example, the vinyl polymer or copolymer content may vary between 20% to 50%. Optimum percentages will depend upon the particular polymer or copolymer used and the physical characteristics of the compound desired. The soft diluent resin may vary from 5% to 30%. The acrylonitrile-butadiene synthetic rubber content may vary from 3% to 10%. For making phonograph records, filler content may vary from 15% to 60% of the composition.

The percentages of the other minor ingredients may also be varied rather widely. The metallic stearate content is preferably varied within the ranges of 0.5% to 2%, the wax may vary from 0.5% to 3%, while the carbon black, if used as a coloring agent, may vary between 1.5% and 5%.

Phonograph records can be made from the above compositions in the usual manner by mixing the materials and blending them in a heated Banbury type mixer until thorough and complete dispersion of the ingredients has been attained. The resulting homogeneous mixture may then be sheeted on heated rolls and the sheets cut into biscuits, which are later pressed into the well known disc form.

Records made from these compositions are characterized by having a flexibility similar to records made of the vinyl resins alone and they have, besides, high flexural strength, good wear resistance properties and high resistance to cold flow.

I claim as my invention:

1. A sound record made of a molded composition comprising 20 to 50% of a vinyl resin from the class consisting of polyvinyl chloride, vinyl chloride-vinyl acetate copolymers having from 2.5 to 15% polyvinyl acetate, and vinyl chloride-vinylidene chloride copolymers having from 5 to 10% vinylidene chloride, also 3 to 10% acrylonitrile-butadiene copolymer synthetic rubber, 5 to 30% of the gasoline insoluble, aromatic hydrocarbon soluble resinous extract of pinewood, 0.5 to 3% of a wax, and 15 to 60% of a finely divided mineral filler, said record having a playing surface with a sound groove therein.

2. A sound record according to claim 1 in which said vinyl resin is 20% of a vinyl chloride-vinylidene chloride copolymer of which 95% is polyvinyl chloride, and containing additionally 8% of said copolymer synthetic rubber, 15% of said resinous extract of pinewood, 1% wax, and 52% mineral filler.

3. A sound record according to claim 2 including, in addition, 2% of a metallic stearate and 2% carbon black.

4. A sound record according to claim 1 in which said vinyl resin is said vinyl chloride-vinyl acetate copolymer.

CLINTON L. PARKER.

REFERENCES CITED

The following references are of record in the file of this patent:

UNITED STATES PATENTS

| Number | Name | Date |
|---|---|---|
| 2,130,239 | Hunter | Sept. 13, 1938 |
| 2,307,180 | Yngve | Jan. 5, 1943 |
| 2,330,353 | Henderson | Sept. 28, 1943 |
| 2,476,714 | Ender | July 19, 1949 |

OTHER REFERENCES

Young et al., pages 1446–1449, Ind. and Eng. Chem., Nov. 1947.

Kenney, pages 106 and 107, Modern Plastics, Sept. 1946.